(12) United States Patent
Bryan

(10) Patent No.: US 7,178,812 B1
(45) Date of Patent: Feb. 20, 2007

(54) CONTAINER LIFT AND TRANSPORT CART

(76) Inventor: Amanda Bryan, 1718 Wild Horse Canyon, Katy, TX (US) 77493

( * ) Notice: Subject to any disclaimer, the term of this patent is extended or adjusted under 35 U.S.C. 154(b) by 0 days.

(21) Appl. No.: 10/998,786

(22) Filed: Nov. 29, 2004

Related U.S. Application Data

(60) Provisional application No. 60/525,290, filed on Nov. 28, 2003.

(51) Int. Cl.
*B62B 1/14* (2006.01)
(52) U.S. Cl. .................. 280/47.24; 280/248; 280/47.19
(58) Field of Classification Search ............. 280/47.24, 280/248, 79.5, 79.2, 47.19
See application file for complete search history.

(56) References Cited

U.S. PATENT DOCUMENTS

| | | | | |
|---|---|---|---|---|
| 4,363,496 A | * | 12/1982 | Schreiner | 280/47.35 |
| 5,427,393 A | * | 6/1995 | Kriebel | 280/47.28 |
| 5,464,104 A | * | 11/1995 | McArthur | 211/133.3 |
| 5,697,624 A | * | 12/1997 | Faraj | 280/47.19 |
| 5,820,145 A | * | 10/1998 | Osowski | 280/79.7 |
| 6,019,381 A | * | 2/2000 | Krawczyk | 280/47.18 |
| 6,315,310 B1 | * | 11/2001 | Hurt | 280/79.5 |
| 6,382,642 B1 | * | 5/2002 | Rainey | 280/47.24 |

* cited by examiner

*Primary Examiner*—J. Allen Shriver
*Assistant Examiner*—Cynthia F. Collado
(74) *Attorney, Agent, or Firm*—Kenneth A. Roddy

(57) ABSTRACT

A hand cart for lifting and transporting containers that have hand grip apertures or handles in their sides or ends, or have an inverted U-shaped rim surrounding an open top end. The cart has a base with wheels rotatably mounted at respective laterally opposed ends thereof. An elongate telescoping handle secured to the base extends vertically upward therefrom and has a handgrip mounted on the top end thereof. A J-shaped hook mounted on the handle is adjustably positioned along the length of the handle and releasably connected thereto at selected heights relative to a floor surface and has an outer facing upturned portion. The handle is pivoted forwardly and then rearwardly to releasably engage the hook with the hand grip aperture, handle or rim on a proximal side or end of the container and pivoted further rearwardly to engage the base with a lower portion of the proximal side or end of the container to raise the container off of the floor surface and transport it to a desired location.

6 Claims, 4 Drawing Sheets

CONTAINER LIFT AND TRANSPORT CART

CROSS REFERENCE TO RELATED APPLICATION

This application claims priority of U.S. Provisional Application Ser. No. 60/525,290, filed Nov. 28, 2003.

BACKGROUND OF THE INVENTION

1. Field of the Invention

This invention relates generally to hand carts, and more particularly to a hand cart for lifting and transporting containers that may contain heavy articles.

2. Background Art

Laundry baskets used to transport clothes and the like usually consist of a generally rectangular container formed of molded plastic that have hand grip apertures in their sides or ends, or have an inverted U-shaped rim surrounding their open top end, which allow them to be grasped and lifted by a user. When loaded, and especially if the contents are wet, such baskets or containers can be quite heavy, making them difficult to move any substantial distance by hand.

Similar rectangular containers formed of molded plastic are used in trash and garbage collection for separating and storage of different categories of recyclable materials. These containers are to be loaded with materials such as plastic, glass, aluminum cans, junk mail, paper, cardboard, etc. When filled, the containers need to be moved to the pick up spot, then returned to a storage spot and filled again.

Krawczyk, U.S. Pat. No. 6,019,381 discloses multiple use hand trucks fitted with a load carrying nose plate for carrying large canvas commercial/industrial laundry bags and for normal hand truck use. The trucks have a two-wheel supported frame assembly with a nose plate projecting perpendicular thereto. A support assembly connected to the base end of the main frame assembly provides an extension projecting parallel outwardly beyond the nose plate. A generally rigid receptacle suspension frame system from which the fabric receptacle depends has a device thereon for demountably supporting the outer end of the suspension frame system and a support part on the main frame assembly demountably interfits with and carries the opposite inner end of the suspension frame system. The hand truck in several versions is convertible for use in four-wheeled as well as two-wheeled configurations.

Faraj, U.S. Pat. No. 5,697,624 discloses a cart for transporting bags, cartons and other containers of groceries or other items from the point of purchase. The cart has a support member with a top and bottom end portions and a middle portion intermediate the top and bottom end portions. A wheel is mounted on the bottom end portion of the support member and a handle is attached to the top end portion. A plurality of hooks are fixed on the middle portion of the support member for receiving handles of bags of groceries or other items and supporting the bags for transport. A foldable bracket on the middle portion of the support member below the hooks supports a container, such as a carton of soft drinks or bag of animal food.

McArthur, U.S. Pat. No. 5,464,104 discloses a mobile storage rack for trash recycling containers or bins that is a free standing vertical frame having a pair of vertical members with support hooks fixed to each vertical member in pairs at equal predetermined heights that the containers or bins are supported on. The containers or bins mount vertically above each other. The support hooks allow the bins to hang in a fashion that creates an increased access space between lower bins. The base has an axle and a pair of wheels that allows the rack fully loaded to be moved. The base also has two stabilizing legs that allows frame to be free standing and any load on support hooks is transferred to the stabilizing legs. Mounted on the opposite side of frame are two brackets that hold flat rigid material such as cardboard. The containers or bins must be lifted manually and placed one above the other on the support hooks.

Kriebel, U.S. Pat. No. 5,427,393 discloses a crate moving device for dragging a stack of crates which have hand grip orifices and bottom weight bearing flanges such as milk crates, egg crates, bread crates, etc. The device comprises a non-linearly shaped lever rod having an upper portion and an angularly offset lower portion with an L-shaped attachment member at the bottom thereof, a handle at the top end thereof, a rigid L-shaped stop attached to the attachment member, a hook fixed to the lever at the juncture of the upper portion and angularly offset lower portion, and a roller assembly mounted on the L-shaped attachment member comprised of a plurality of cylinders, cylinder rings, axle rings, bearings, and a stationary axle. The hook is inserted into a handle orifice of a bottom most one of a stack of crates, the roller is slid toward crate until the L-shaped stop engages the proximal crate side. Downward pressure exerted on the handle to cause the bottom edge of the proximal side of the crate to be lifted off the floor surface while the bottom edge of the distal side remains in contact with the floor surface. The crate stack is then tilted away from the device and grasped by the user at the top most crate to keep the crate stack from toppling. The crate stack is moved by simultaneously rolling and dragging the crate stack over floor surface with the bottom edge of the distal side of the stack engaged on the floor surface. The area of the bottom most crate dragged across the floor is reduced to a single edge and a portion of the crate stack's weight is supported by the roller of the crate moving device.

The present invention is distinguished over the prior art in general, and these patents in particular by a hand cart for lifting and transporting containers that have hand grip apertures or handles in their sides or ends, or have an inverted U-shaped rim surrounding an open top end. The cart has a base with wheels rotatably mounted at respective laterally opposed ends thereof. An elongate telescoping handle secured to the base extends vertically upward therefrom and has a handgrip mounted on the top end thereof. A J-shaped hook mounted on the handle is adjustably positionable along the length of the handle and releasably connected thereto at selected heights relative to a floor surface and has an outer facing upturned portion. The handle is pivoted forwardly and then rearwardly to releasably engage the hook with the hand grip aperture, handle or rim on a proximal side or end of the container and pivoted further rearwardly to engage the base with a lower portion of the proximal side or end of the container to raise the container off of the floor surface and transport it to a desired location.

SUMMARY OF THE INVENTION

It is therefore an object of the present invention to provide a hand cart for lifting and transporting containers such as laundry baskets, ice chests, storage containers and other containers that have hand grip apertures or handles in their sides or ends, or have an inverted U-shaped rim surrounding an open top end.

It is another object of this invention to provide a hand cart that will easily lift and transport heavy containers from one location to another.

Another object of this invention is to provide a hand cart that will easily and quickly engage and release containers that have hand grip apertures or handles in their sides or ends, or have an inverted U-shaped rim surrounding an open top end for lifting and transporting them from one location to another.

Another object of his invention is to provide a hand cart that is adjustable for engaging, lifting and transporting different sizes and styles of containers that have hand grip apertures or handles in their sides or ends, or have an inverted U-shaped rim surrounding an open top end.

A further object of his invention is to provide a hand cart having a handle that is adjustable in length to allow use by users of different height.

A still further object of this invention is to provide a hand cart for lifting and transporting containers that is simple in construction, inexpensive to manufacture, and safe, rugged and reliable in operation.

Other objects of the invention will become apparent from time to time throughout the specification and claims as hereinafter related.

The above noted objects and other objects of the invention are accomplished by a hand cart for lifting and transporting containers that have hand grip apertures or handles in their sides or ends, or have an inverted U-shaped rim surrounding an open top end. The cart has a base with wheels rotatably mounted at respective laterally opposed ends thereof. An elongate telescoping handle secured to the base extends vertically upward therefrom and has a handgrip mounted on the top end thereof. A J-shaped hook mounted on the handle is adjustably positionable along the length of the handle and releasably connected thereto at selected heights relative to a floor surface and has an outer facing upturned portion. The handle is pivoted forwardly and then rearwardly to releasably engage the hook with the hand grip aperture, handle or rim on a proximal side or end of the container and pivoted further rearwardly to engage the base with a lower portion of the proximal side or end of the container to raise the container off of the floor surface and transport it to a desired location.

DESCRIPTION OF THE PREFERRED EMBODIMENT

Figure 1:
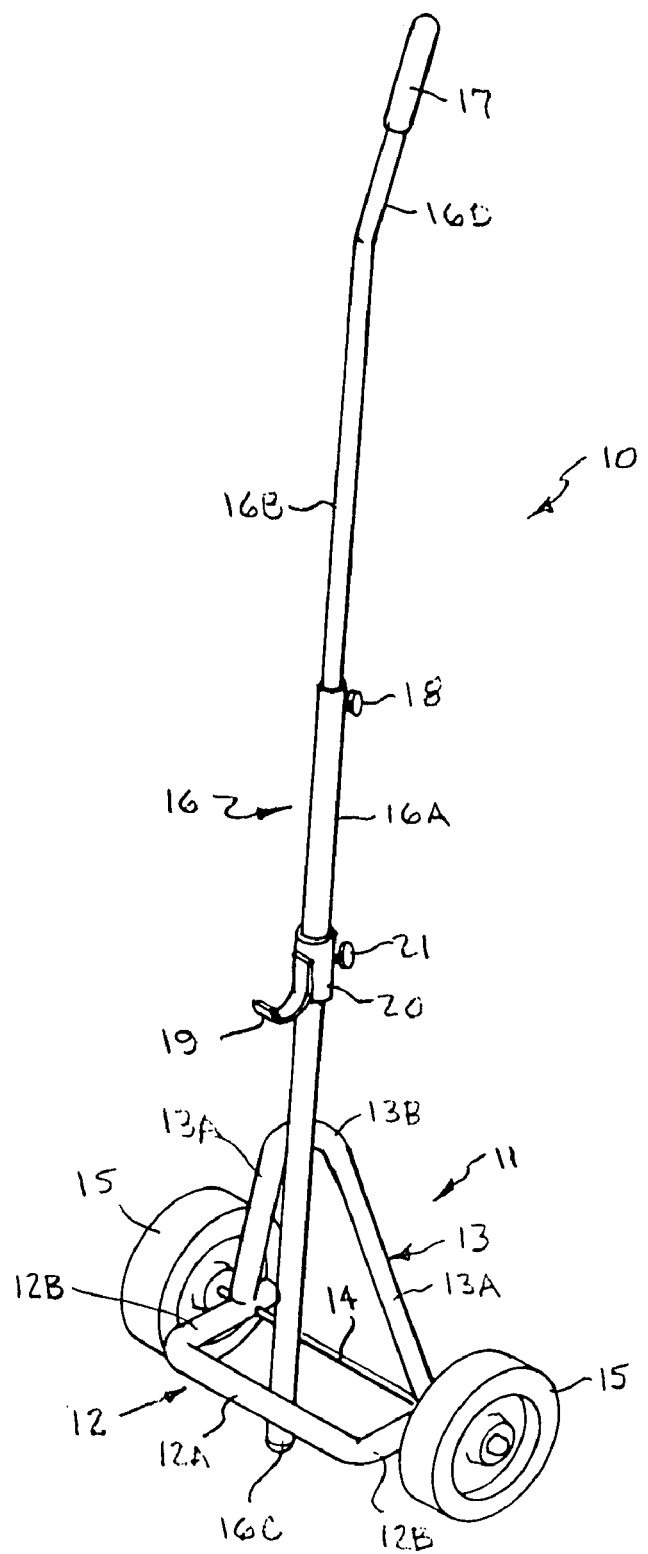
FIG. 1 is an isometric view of the container lift and transport cart in accordance with the present invention.
Figure 2:
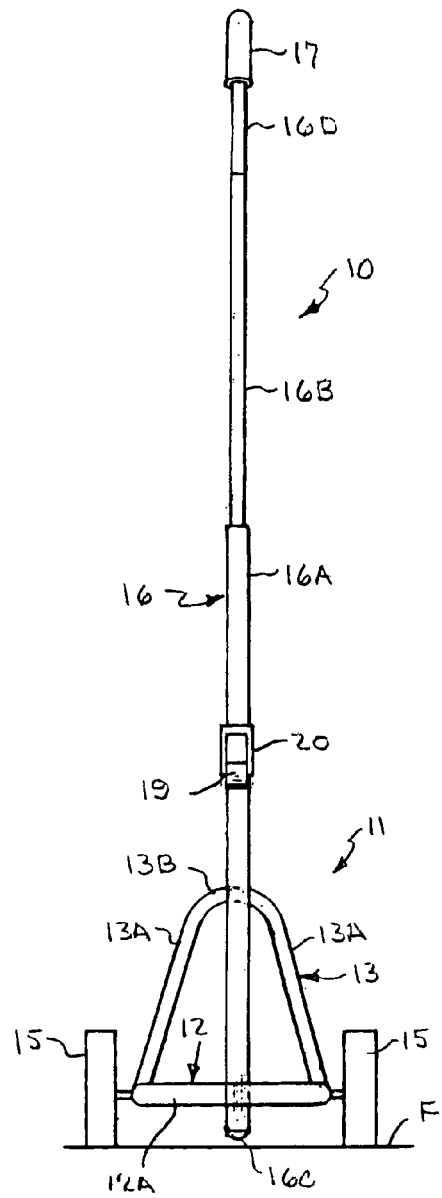
FIG. 2 is front elevation view of the container lift and transport cart.
Figure 3:
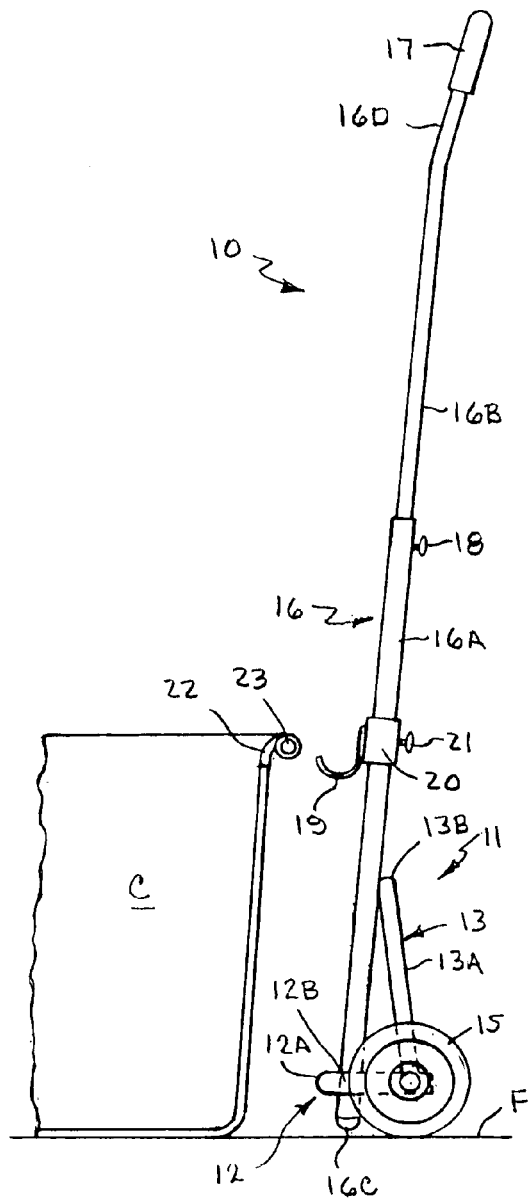
FIG. 3 is a side elevation view of the container lift and transport cart, with a portion of the a container to be lifted shown adjacent to the cart.

Referring to the drawings by numerals of reference, there is shown in FIGS. 1 through 3, a container lift and transport cart 10 in accordance with the present invention. The cart 10 has a generally rectangular base 11 formed of tubular members. The base 11 has a wide generally U-shaped cross member 12 with a straight longer front portion 12A and opposed ends that are bent to form shorter side portions 12B that extend rearwardly in parallel laterally spaced relation. An inverted generally V-shaped tubular member 13 is secured at its bottom end to the shorter side portions 12B of the cross member 12 near their rearward ends and its legs 13A extend angularly upward therefrom and adjoin a curved apex or top portion 13B.

An axle rod 14 extends rotatably through the shorter side portions 12B of the cross member 12 near their rearward ends, and a pair of wheels 15 are mounted on the outer ends thereof in a conventional manner. As best seen in FIG. 3, the longer front portion 12A of the cross member 12 is disposed forward of the outer diameter of the wheels 15.

An elongate tubular handle assembly 16 having a lower tubular section 16A and an upper tubular section 16B telescopically received therein is secured to the cross member 12 and the inverted V-shaped member 13. The lower tubular section 16A is secured to the backside of the longer front portion 12A of the cross member 12 and to the curved apex or top portion 13B of the V-shaped member 13, such that the handle assembly 16 extends upwardly and rearwardly at a slight angle relative to a vertical axis. The bottom end of the lower tubular section 16A terminates a short distance below the longer front portion 12A of the cross member 12 and is provided with an end cap 16C. The bottom portion of lower tubular section 16A beneath the front portion 12A of the cross member 12 serves as a short leg.

The upper section 16B of the handle assembly 16 extends upwardly from the lower section 16A coaxial therewith and, in a preferred embodiment, has a short angularly bent top portion 16D. A resilient handgrip 17 is installed on the end of the top portion 16D of the tubular handle member 16.

A thumbscrew 18 is installed in the lower tubular section 16A near its upper end, whereby the thumbscrew releasably engages the upper tubular section 16B in a tightened condition and allows telescoping sliding movement of the upper tubular section relative to the lower tubular section in a loosened condition such that the handle member 13 may be shortened or lengthened and the handgrip 14 adjustably positioned at a selected height to be comfortably gripped by a user in a standing position. It should be understood that other conventional adjustment and latching means for telescoping tubular members may be used in place of the thumbscrew 18, for example, a plurality of longitudinally spaced holes in one tubular member and a ball detent mechanism in the other.

A J-shaped hook 19 is mounted on the lower section 16A of the handle assembly 16 between the inverted V-shaped member 13 and the thumbscrew 18. In a preferred embodiment, the J-shaped hook 19 is secured to a collar 20 that is slidably mounted on the tubular lower section 16A and is provided with a thumbscrew 21 that releasably engages the lower section 16A in a tightened condition and allows sliding movement relative thereto in a loosened condition, whereby the J-shaped hook 19 may be adjustably positioned at a selected height above the surface of the floor.

Figure 5:
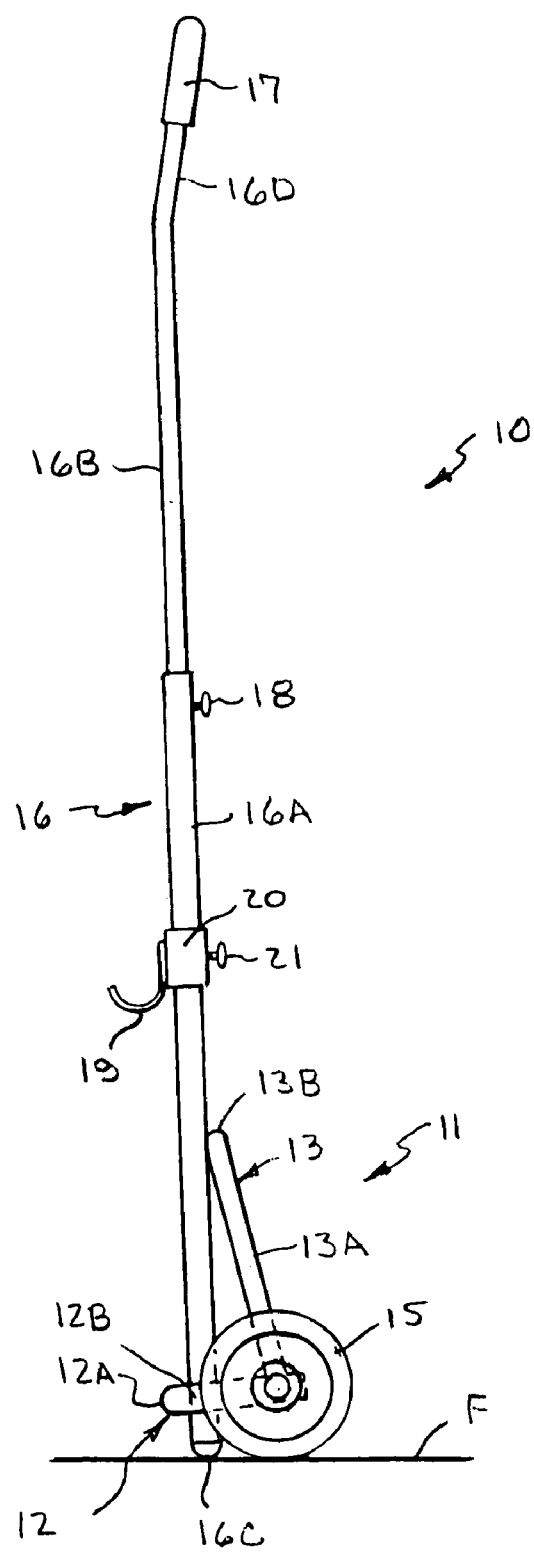
FIG. 5 is a side elevation view showing the container lift and transport cart supported on a floor surface in an upright stored position.

As seen in FIG. 5, the bottom portion of lower tubular section 16A beneath the front portion 12A of the cross member 12 is of sufficient length to allow slight forward pivotal movement of the handle assembly 16 about the axis of the wheels 15, and upon further forward pivotal movement to engage the end cap 16C on the floor surface F to support the cart in a generally upright stored position with the longitudinal axis of the handle assembly disposed slight angularly forward of a vertical axis when not in use.

Figure 4:
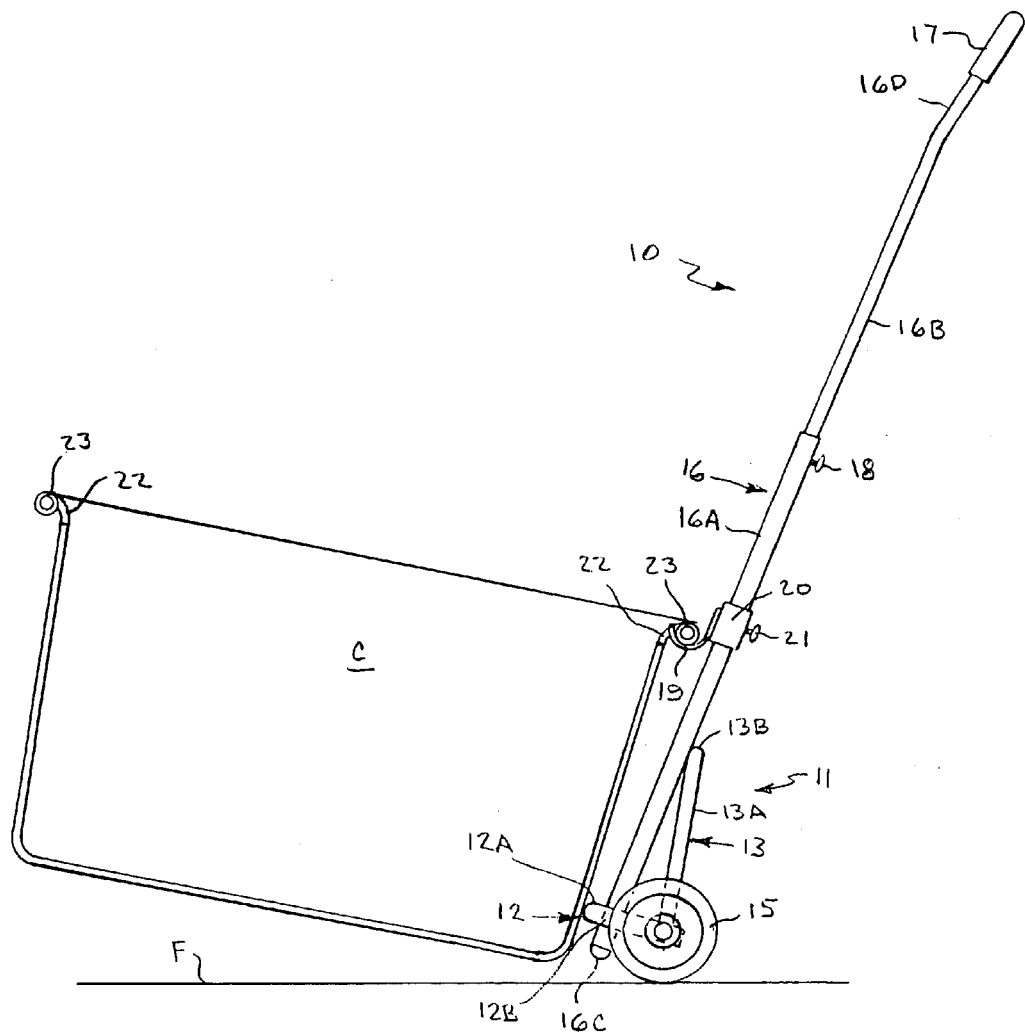
FIG. 4 is a side elevation view showing the container lift and transport cart in use lifting and transporting a container.

As best seen in FIGS. 3 and 4, the cart 10 is particularly suited to lift and transport generally rectangular molded plastic containers C that have manual lifting means in their sides or ends that allow them to be manually lifted and transported, such as laundry baskets having apertures in their sides or ends that define hand grips, ice chests having U-shaped handles, or storage bins or containers that have an inverted U-shaped rim surrounding their open top end.

The container C which is illustrated herein for purposes of example, but not limited thereto, is shown to be a generally rectangular molded plastic laundry basket having apertures 22 in its sides or ends that define hand grips 23 that allow it to be grasped and lifted by a user. It should be understood that the cart 10 may be used to lift and transport other types of generally rectangular molded plastic containers C that have manual lifting means in their sides or ends that allow them to be manually lifted and transported.

OPERATION

In operation the cart is positioned in a generally upright condition closely adjacent to the side of the container C and grasped by the handgrip 17. The tubular handle assembly 16 is pivoted forwardly about the horizontal axis of the wheels 15 to position the J-shaped hook 19 in an aperture 22 or handle in the proximal side or end of the container or in an inverted U-shaped rim surrounding the open top end of the container. The handle assembly 16 is then pivoted rearwardly about the axis of the wheels 15 to raise and engage the J-shaped hook 19 in the aperture 22, handle or inverted U-shaped rim and pivoted further rearwardly such that the front portion 12A of the cross member 12 engages and supports the lower portion of the proximal side or end of the container C and the container is raised off of the floor. In this position the weight of the loaded container C is supported by the cart and the loaded container may be easily transported to a desired location. At the desired location, the procedures described above are reversed to deposit the container on the floor, disengage the hook and remove the cart from the container.

While this invention has been described fully and completely with special emphasis upon preferred embodiments, it should be understood that within the scope of the appended claims the invention may be practiced otherwise than as specifically described herein.

The invention claimed is:

1. A hand cart for lifting and transporting containers that have hand grip apertures or handles in their sides or ends, or an inverted U-shaped rim surrounding an open top end, the cart comprising:
   a a base having a wide generally U-shaped tubular cross member with a straight longer front portion and opposed ends that are bent to form shorter side portions that extend rearwardly in laterally spaced relation, an inverted generally V-shaped tubular member secured at a bottom end to said shorter side portions and having legs extending angularly upward therefrom adjoining a curved top portion, and an axle rod extending rotatably through said shorter side portions of said cross member near their rearward ends;
   a pair of wheels each mounted at a respective laterally opposed end of said axle rod, and said front portion of said cross member disposed in a plane forward of the outer diameter of said wheels;
   an elongate longitudinal handle member having a lower portion secured to said base extending vertically upward therefrom and having an upper portion;
   a handgrip on said upper portion of said handle member to be gripped by a user; and
   a J-shaped hook member adjustably mounted on said handle member, said hook member being adjustably positioned along the length of said handle member and releasably secured thereto at selected heights relative to a floor surface, and having an outer facing upturned portion adapted to receive and releasably engage a hand grip aperture or handle in the side or end of the container to be lifted, or an inverted U-shaped rim surrounding an open top end of the container, when said handle member is pivoted rearwardly relative to a vertical axis; wherein
   said cart is positioned closely adjacent to a proximal side or end of the container to be lifted and said handle member is pivoted forwardly about the horizontal axis of said wheels to position said hook beneath the hand grip aperture, handle or inverted U-shaped rim, and is then pivoted rearwardly about the axis of said wheels to engage said hook with the aperture, handle or rim and pivoted further rearwardly such that said front portion of said cross member engages a lower portion of the proximal side or end of the container to raise the container off of a floor supporting surface, and transport it to a desired location.

2. The hand cart according to claim 1, wherein
said handle member comprises a lower tubular section secured to the backside of said tubular cross member front portion and to said V-shaped member curved top portion to extend upwardly and rearwardly at a slight angle relative to a vertical axis;
an upper tubular section having a lower portion telescopically received in said lower tubular section; and
adjustment and latching means connected therebetween for releasably securing said upper tubular section and said lower tubular section together to adjust the length of said handle member such that said handgrip is positioned at a selected height to be comfortably gripped by the user in a standing position.

3. The hand cart according to claim 2, wherein
said adjustment and latching means comprises a thumbscrew rotatably mounted near an upper end of said lower tubular section for releasably engaging said upper tubular section in a tightened condition and allowing telescoping sliding movement thereof relative to said lower tubular section in a loosened condition such that said handle member is shortened or lengthened to position said handgrip at a selected height to be comfortably gripped by the user in a standing position.

4. The hand cart according to claim 2, wherein
said J-shaped hook member is secured to a collar member slidably mounted on said lower tubular section, said collar member having a thumbscrew rotatably mounted thereon for releasably engaging said lower tubular section in a tightened condition and allowing sliding movement relative thereto in a loosened condition for adjustably positioning said hook along the length thereof and positioning said hook upturned portion to receive and releasably engage the hand grip aperture, handle or rim, when said handle member is pivoted rearwardly relative to a vertical axis.

5. The hand cart according to claim 2, wherein
said handle member lower tubular section terminates a distance below said cross member front portion sufficient to allow slight forward pivotal movement of said handle about the axis of said wheels, and upon further forward pivotal movement to engage the floor supporting surface and support said cart in a generally upright stored position when not in use.

6. The hand cart according to claim 5, further comprising:
an end cap on the bottom end of said lower tubular section to engage the floor supporting surface and support said cart in said generally upright stored position.

* * * * *